UNITED STATES PATENT OFFICE.

FRIEDRICH WILHELM DUPRÉ, OF LEOPOLDSHALL, GERMANY.

PROCESS OF EXTRACTING GOLD FROM ITS ORES.

No. 799,548.          Specification of Letters Patent.          Patented Sept. 12, 1905.

Application filed April 27, 1905. Serial No. 257,759.

*To all whom it may concern:*

Be it known that I, FRIEDRICH WILHELM DUPRÉ, a subject of the King of Great Britain, residing at 1 Gartenstrasse, Leopoldshall, Duchy of Anhalt, German Empire, have invented new and useful Improvements in Processes of Extracting Gold from Its Ores, of which the following is a specification.

This invention relates to the process of extracting gold from its ores by means of a solution of cyanid of an alkali or alkaline earth, and has for its object to render the process more expeditious and considerably cheaper.

In extracting gold from its ores by means of an aqueous solution of cyanid of potassium, sodium, barium, &c., the simultaneous oxidation of the gold is necessary, and this has hitherto been effected by the action of the air or oxidizing substances—such as a permanganate, potassium ferricyanid, and the like—upon the gold, which is rendered oxidizable thereby by the action of the cyanid solution. I have now found that the action of the air on gold may be increased if I use instead of water for the liquid with which I leach the gold ores a mixture of water and alcohols. Alcohols dissolve a considerably larger amount of oxygen than pure water may do. I have found that the presence of alcohols in the cyanid liquid used for leaching the gold ores increases the power of dissolving gold in a very high degree. Even a small addition of alcohol to one hundred parts of the aqueous cyanid solution will considerably increase the speed with which the gold is dissolved and also the amount of gold dissolved. I prefer to use for carrying out my process ethyl alcohol. I may, however, also use other aliphatic alcohols, mono, valents, or more valents—for instance-methyl alcohol, amyl alcohol, glycerin. The skilled workman will choose the alcohol suitable for his purposes according to the prizes of the alcohols and the possibility to obtain the required amounts. As I stated before, small amounts of alcohol will be sufficient for increasing the solubility of the gold. With rich earths, or more especially gangues, a large percentage may also advantageously be used, as the alcohol not only increases the solubility of the gold, but also prevents to a considerable extent the solution of undesirable matters which the gangue may contain. I may add such amounts of alcohols to the aqueous solution that the mixture may keep a sufficient amount of cyanid dissolved, the solubility of cyanid in water being decreased according to the percentage of alcohols. The skilled workman will choose the suitable amount of the alcohols according to his special purposes. From the solutions obtained by leaching the ores by means of the cyanid solution containing alcohols I may recover the gold by means of electrolysis in using anodes of iron and cathodes of lead. I may, however, use also other processes for recovering the gold. I may recover the alcohol added to the cyanid solution before depositing the gold by any suitable process—for instance, by distillation. I may, however, recover the gold from the solution obtained by leaching the ores without separating the alcohols.

What I claim as my invention, and desire to secure by Letters Patent, is—

1. The process of extracting gold from its ores consisting in subjecting the ores to the dissolving action of aqueous solutions of cyanids in the presence of alcohols.

2. The process of extracting gold from its ores consisting in subjecting the ores to the dissolving action of aqueous solutions of cyanids in the presence of ethyl alcohol.

In testimony whereof I have signed my name to this specification in the presence of two subscribing witnesses.

FRIEDRICH WILHELM DUPRÉ.

Witnesses:
     WOLDEMAR HAUPT,
     HENRY HASPER.